Figure 4:
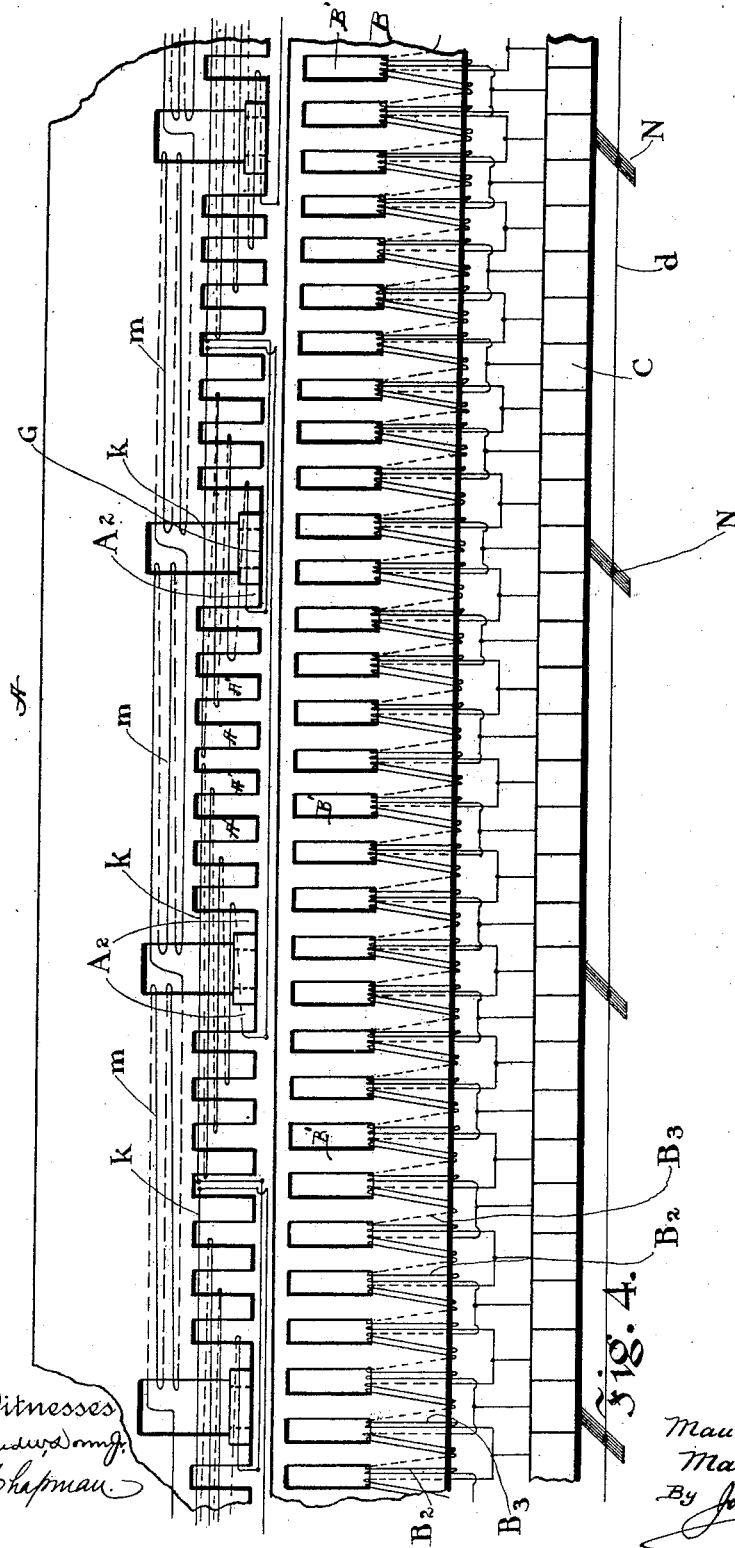

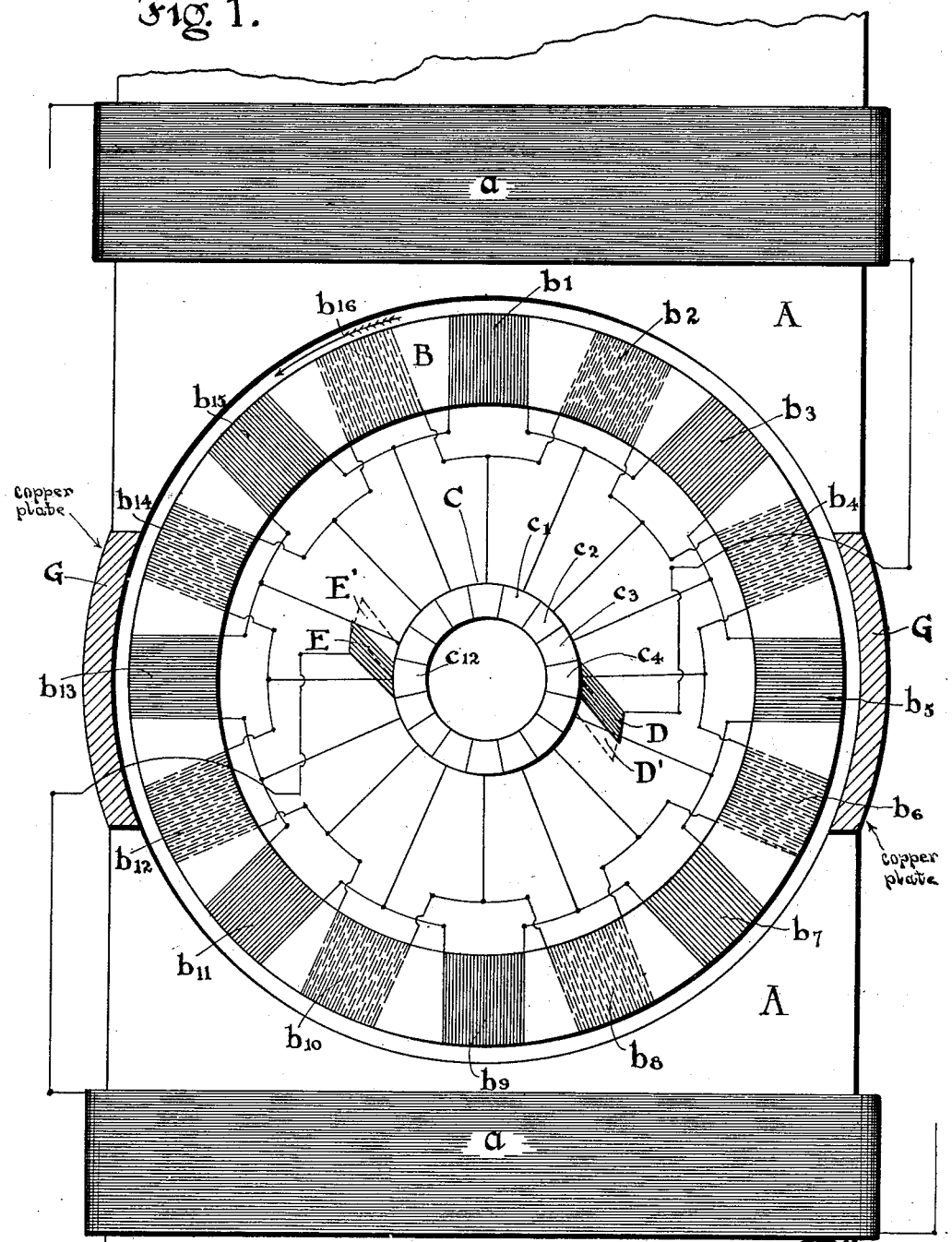

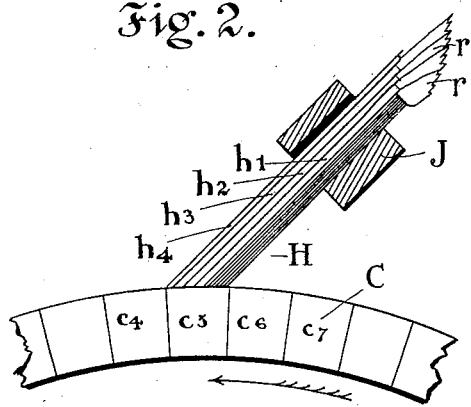
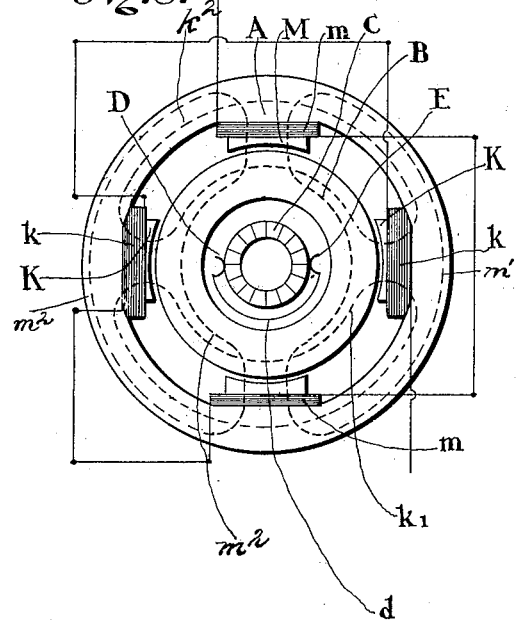
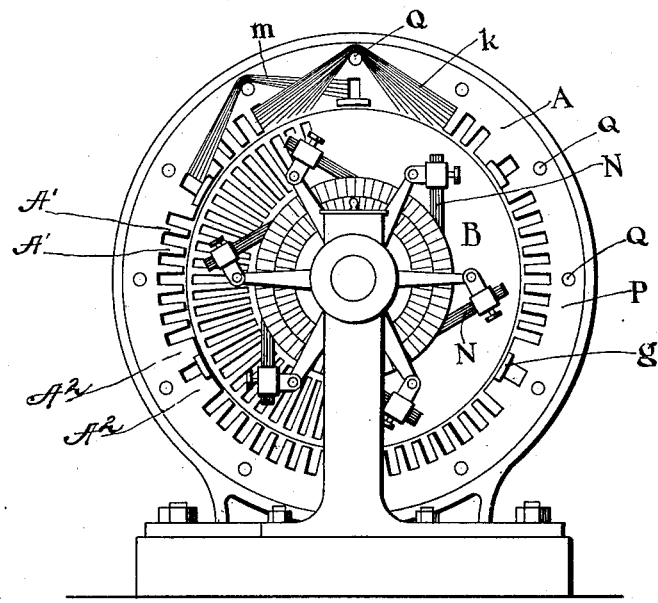

No. 628,245. Patented July 4, 1899.
M. HUTIN & M. LEBLANC.
DYNAMO ELECTRIC MACHINE.
(Application filed Apr. 10, 1897.)
(No Model.) 3 Sheets—Sheet 3.

United States Patent Office.

MAURICE HUTIN AND MAURICE LEBLANC, OF PARIS, FRANCE, ASSIGNORS TO THE SOCIÉTÉ ANONYME POUR LA TRANSMISSION DE LA FORCE PAR L'ÉLECTRICITÉ, OF SAME PLACE.

DYNAMO-ELECTRIC MACHINE.

SPECIFICATION forming part of Letters Patent No. 628,245, dated July 4, 1899.

Application filed April 10, 1897. Serial No. 631,625. (No model.)

*To all whom it may concern:*

Be it known that we, MAURICE HUTIN and MAURICE LEBLANC, citizens of the Republic of France, and residents of Paris, France, have invented certain new and useful Improvements in Dynamo-Electric Machinery, of which the following is a specification, and for which Letters Patent have been granted in France, dated December 19, 1892, No. 226,501; in Austria, dated June 19, 1893, No. 46,583; in Hungary, dated June 19, 1893, No. 72,958; in Belgium, dated June 19, 1893, No. 105,125; in Switzerland, dated June 24, 1893, No. 7,070; in Italy, dated August 21, 1893, No. 34,709/129, and in England, dated June 20, 1893, No. 12,139.

Our invention relates to improvements in dynamo-electric machinery, having particular reference to single-phase alternating-current motors, though in many respects our improvements are applicable to dynamo-machines of any type whatever, whether used as generators or as motors.

It is well known that a series-wound dynamo-machine of the direct-current type will run as a motor on a single-phase alternating current; but such a machine so used is open to two very serious objections. In any ordinary commutated armature it is necessary to short-circuit each coil as it passes under the brush, which tends to cause a wasteful expenditure of energy and a destructive spark; but in direct-current dynamos and motors it is possible to avoid this effect, in a great measure at least, by proper design. The conditions for non-sparking are that the electromotive force induced by the field-magnet in the short-circuited coil at the moment of commutation shall be sufficient to balance its self-induction and to get up in the coil a current in the direction opposite to that in which the current had formerly been flowing in that coil such that just as the coil is placed in its new relation with respect to the armature-winding as a whole—that is to say, just as its transfer from one side of the armature to the other is completed—it will be the seat of a current just equal in magnitude and direction to the current which it must carry in its new relation. Though these matters are so well understood that it is now possible to design and build direct-current dynamos which shall be nearly sparkless it is impossible to apply the same principles successfully to alternating-current motors for the reason that in this last case the commutation is performed in a field which is constantly varying in intensity. There is therefore of necessity a great waste of energy and a troublesome series of sparks in all alternating motors of what is known as the "direct-current type." In addition the great self-induction of the circuits in such motors cuts down the useful effect to a large extent, requiring the motors to be built very large in proportion to the power which they are to exert.

Our invention consists in certain improvements which result in reducing the sparking, the waste of energy, and the self-induction of alternating-current motors. We divide the armature-winding into a plurality of groups, preferably two, so arranged that it is impossible for the brushes to short-circuit any particular coil, and at the same time we prefer to provide a magnetic screen which prevents any flux from passing through the coils at the instant of commutation. We also provide a brush of a peculiar construction which breaks the circuit through the commutated coils gradually, which has the effect of still further reducing the sparking. We also modify the structure and connections of the machine so as to reduce the self-induction, and, further, provide certain other minor improvements to be hereinafter more particularly described and claimed.

The theory of operation as well as the preferred practical form of our improved motors are illustrated in the drawings attached to this specification, in which—

Figure 1 shows a motor so designed as to be practically sparkless at all speeds. Fig. 2 shows our improved brush. Fig. 3 shows in a simple form a motor so designed as to have a low self-induction. Fig. 4 is a development of a portion of the field-magnet and armature of our improved motor in its preferred form, and Fig. 5 is a general view of the motor illustrated in Fig. 4.

In Fig. 1, A A are the field-magnet poles, and B is the armature. The field-magnet is wound with coils $a\ a$, connected in this case in series with each other and with the brushes D E, bearing on the commutator C. The armature-winding consists of a number of coils $b'\ b^2\ b^3$, &c., joined in series in two sets—that is to say, the even-numbered coils $b^2\ b^4\ b^6$, &c., and the odd-numbered coils $b'\ b^3\ b^5$, &c., each form a continuous Gramme winding, and the two windings are electrically independent and displaced from each other on the armature-core. Each winding is connected to the commutator C as shown in such a way that the odd-numbered segments of the commutator $c'\ c^3\ c^5$, &c., are joined to the connections between the odd-numbered coils, and the even-numbered segments $c^2\ c^4\ c^6$, &c., are joined to the connections between the even-numbered coils. The result is that we have two independent Gramme windings on a single core, the two windings being connected to alternate sections of the commutator. In the position shown the brush D bears on the segment $c^4$ and the brush E bears on the segment $c^{12}$, so that the even-numbered coils only are active. It will be noticed that the brushes are of a breadth less than the width of one commutator-segment, so that no brush can ever bear on three segments at once, so that no coil can ever be short-circuited. A little later as the armature is supposed to be rotating in the direction of the arrow the brushes will each bear on two segments, as shown at D' E', and current will flow in both sets of coils; but if the impedance of the armature is small with relation to that of the field-magnets the total current and the total energy of the system will remain practically constant, and the current will divide, flowing through the armature in both sets of coils—that is to say, in four paths, if the armature-windings are of the ordinary two-path variety as shown. A little later still the brushes will bear on the odd-numbered segments $c^5\ c^{13}$ only, and all of the current will flow in the odd-numbered coils.

The best condition for the prevention of sparking and loss of energy is evidently that the energy of the system shall remain constant. Now if we neglect the coils under commutation it is evident that the two circuits are identical both in impedance and in induced and counter electromotive force. It is then only in the extreme coils of each set, those under commutation, that a loss of energy can take place, as will be evident from other considerations. The loss of energy in the extreme coils will be reduced in proportion as we carry further the subdivision of the winding and increase the number of coils and commutator-segments. It may be still further reduced and the two circuits rendered practically equivalent as far as counter electromotive force is concerned at the moment of commutation, in spite of their slightly different relation to the polar projections of the field-magnet, if we properly screen the coils under commutation by providing the copper plates G G, joining the tips of the pole-pieces, as shown. These plates will evidently oppose the variation of the distribution of the magnetic flux due to commutation, since all such variations will set up eddy-currents in the copper plates, the effect of which is to neutralize the tendency to variation of flux.

Theoretical considerations lead to the conclusion that in a motor constructed as shown in Fig. 1 the sparking would entirely vanish. Owing to slight irregularities in the winding and in the magnetic material of the armature and field-cores this result is not perfectly realized in practice, and we have noticed in such motors a slight tendency to form sparks at each brush as it leaves a segment. In order to completely suppress the sparking, it is necessary to break each circuit gradually—that is, to interpolate resistances—preferably gradually increasing in magnitude in the circuit of each brush as it leaves a commutator-segment. This we accomplish by substituting for the brush ordinarily used brushes of the type shown in Fig. 2. This brush is composed of a main portion H in contact with the brush-holder J and a number of thin strips $h'\ h^2$, &c., insulated from each other from the main brush and from the holder. These strips are, however, connected to each other and to the main brush H through the resistances $r\ r$. The action is as follows: In the position shown the whole brush is in contact with the segment $c^5$. A little later if the commutator is rotating in the direction of the arrow the main portion H will have left $c^5$ and will rest on $c^6$. The current from the odd-numbered coils of the armature can still flow through the segment $c^5$ to the strips $h'\ h^2$, &c., and can pass to the holder J, but it will be obliged in doing so to flow through the resistances $r$. Still later when the strip $h'$ has left the segment $c^5$ the resistance in this path will be still further increased, until at the moment the last strip $h^4$ leaves the segment the current flowing in the odd-numbered coils will be so slight that no appreciable spark will result.

The system of commutation above described is not limited in its application to alternating-current motors, but is available in connection with dynamo-electric machines of all types and in any case where the commutation of electric current is desired. Nor do we restrict ourselves to the particular method which we have shown for dividing the armature-winding into two independent circuits or sets of coils and connecting it to a commutator, as other equivalent methods will suggest themselves to those skilled in the art.

The device which we have employed for reducing the bad effects due to self-induction in alternating-current motors will be understood by reference to Fig. 3. It is well known that the apparent self-induction of the primary winding of an ordinary alternating-current transformer is greatly decreased as the current in the secondary increases. We make use of this principle to provide an alternating-current motor of low self-induction, or, more accurately speaking, of low reactance.

In Fig. 3, A is the field-magnet, B the armature, and C the commutator, of a single-phase alternating-current motor. The armature-winding and connections may be of any usual type, but we prefer to employ the armature described above. The wire of the armature may be of any convenient size whatever. K K are the main or inducing poles of the primary structure or field-magnet and are excited by coils $k\,k$. The flux from these poles follows the paths $k'\,k^2$. Brushes D E, preferably of the form shown in Fig. 2, are placed upon the armature in the position shown and connected together by the low-resistance circuit $d$, so that the diameter of commutation is substantially parallel with the axis of the poles K K. The result is if the coils $k\,k$ are fed by an alternating current that a secondary current will be induced in the armature, which, owing to the position of the brushes, will produce poles under the poles K K and substantially one hundred and eighty degrees behind them in phase. The exact angle of lag will depend somewhat on the character of the secondary winding. But it is evident that the poles K K being in line with the armature-poles will have no effect in producing torque. Therefore we provide in addition the poles M M, carrying the coils $m\,m$. These coils, excited preferably in series with the coils $k\,k$, produce the alternating fluxes $m'\,m^2$, which react on the poles of the armature to produce rotation. It will be noticed that the windings are so arranged that the machine is practically a two-pole motor—that is to say, it has only one resultant polar line. The coils $m\,m$ are preferably formed of wire of the same size as the wire used for the coils $k\,k$, but contain a smaller number of turns. We term these poles M M "torque-poles," in distinction from the inducing-poles K K, and by the generic term "primary poles" we mean to include both the poles K and the poles M. It will be evident that the self-induction of this motor as a whole is small, because the coils $m\,m$ have a small number of turns only and it is well known that the self-induction of a coil tends to vary as the square of the number of turns and because the coils $k\,k$ act simply as inducing-coils and their self-induction is cut down by the action of the secondary winding on the armature, which tends to prevent the primary coil from setting up lines of force in its magnetic circuit, as is well known in connection with ordinary transformers.

Though either of the motors which we have here shown are practical commercial machines we prefer to apply the principle of our invention as shown in Figs. 4 and 5.

In Figs. 4 and 5, A is the field-magnet, and B the armature, as before, both built up of stamped laminæ of the form shown. The field-magnet coils are wound in the slots between the projections A' A' and $A^2\,A^2$, &c., while the armature-coils are shown as wound in holes cut near the edge of the core, as seen at B'. The electrical connections will be clear from a reference to Fig. 4. The armature is wound with two sets of coils $B^2\,B^2$ and $B^3\,B^3$, and we prefer to so arrange them that each coil will occupy half of each hole, the two sets being displaced from each other in their position on the core, as in Fig. 1. Connections are made to the commutator C, as before, so that the coils on the armature form two independent Gramme windings connected alternately to a single commutator. The field-magnet is multipolar in character, which allows the motor to run at lower speed and to generate the requisite counter electromotive force without working the iron at too high magnetic density. It is wound with two sets of coils displaced from each other corresponding to the coils $k$ and $m$ on Fig. 3. It will be noticed that some of the slots in the field-core—that is to say, those between the projections $A^2\,A^2$—are larger than the others. The coils $m$ are wound in these slots alone. The coils $k$ are wound so that their centers are half-way between the centers of the coils $m$; but instead of being wound in the large slots they are so arranged as to fill all of the smaller slots over which they extend. The coils of each set are so connected that either set alone would produce poles at the center of each coil, alternately N and S, as we proceed around the the field-magnet structure. Thus it will be seen that we provide a set of inducing-poles, due to the coils $k\,k$, and a set of torque-poles, due to the coils $m\,m$, as in Fig. 3. The inducing-poles act, as in the form above described, to set up currents in the armature, which currents are short-circuited by the brushes N and the connection $d$. As this particular motor has six poles or three polar lines, there are of course six brushes or the equivalet cross connections, as is well understood. The resulting poles in the armature are acted upon by the fluxes, due to the windings $m\,m$, to produce rotation, as will be evident from what has preceded. In order to protect the armature-coils under commutation, we prefer to place in the wide slots between the polar projections $A^2\,A^2$ the copper rings $g\,g$. Each of these rings forms, as it were, a single coil laid over the slot and acts as a screen for the magnetic lines of force, which would otherwise pass through the coil under commutation, as do the plates G G, Fig. 1. Fig. 5 shows the machine as built, some of the windings being removed for clearness. The bronze cheeks P, one at each end of the machine, hold together the laminæ of the field-magnet and support the pins Q Q on which the coils $m$ and $k$ are wound.

It will be evident that any of the motors here shown are perfectly reversible and will act as generators. Thus, for instance, in the form shown in Fig. 3 we may excite the field with alternating currents and take alternating currents from the brushes on the armature. A similar remark applies to Fig. 5.

We do not limit ourselves to the specific forms shown and described, as it is evident that numerous changes may be made without departing from the spirit of our invention; but

We claim as our invention and desire to secure by Letters Patent—

1. The method of reducing the self-induction of a single-phase alternating-current induction-motor, which consists in opposing to the magnetomotive forces of the inducing field-pole coils the magnetomotive forces of the induced armature-coils, and rotating the armature by the action of separate field-torque poles upon the poles produced in the armature by induced currents, substantially as described.

2. A single-phase alternating-current motor having a field-magnet with a set or sets of inducing-poles and a set or sets of torque-poles, energized by alternating currents, an armature having a winding or windings closed upon themselves, and short circuits for said armature across a diameter or diameters substantially parallel with the diameters on which the set or sets of inducing-poles are located, substantially as described.

3. In an electric motor, the combination of two sets of primary poles excited in series by an alternating current, with an armature short-circuited in a line substantially parallel with the axis of one set of poles, substantially as described.

4. In an alternating-current dynamo-electric machine, the combination with the field-magnets and armature, of a magnetic screen adapted to suppress variations in the distribution of the lines of force emerging from certain portions of the armature, substantially as described.

5. In an alternating-current dynamo-electric machine, the combination with the field-magnets and armature, of a magnetic screen adapted to suppress variations in the distribution of lines of force emerging from that portion of the armature which occupies a certain position with relation to the field-magnet, substantially as described.

6. A single-phase alternating-current motor having an armature with sectional winding, means for shifting the points of entry to and exit of current from said coils, and a screen of good conducting material in inductive proximity to each of said points, whereby the variations of flux due to the shifting of the points of entry and exit are checked or neutralized, substantially as described.

7. In a single-phase alternating-current induction-motor, a field-magnet provided with a set or sets of poles for inducing currents in the armature-coils, and another set or sets of torque-poles, the inducing and torque poles each having a like inductive relation to the armature, substantially as described.

8. In a single-phase alternating-current induction-motor, a field-magnet provided with a set or sets of poles for inducing currents in the armature-coils, and another set or sets of torque-poles arranged to have the magnetic flux joining them at right angles to the axis of the armature, substantially as described.

In testimony whereof we have signed our names to this specification in the presence of two subscribing witnesses.

MAURICE HUTIN.
MAURICE LEBLANC.

Witnesses:
HENRY J. WEHLE,
FRED. P. WARREN.